(12) United States Patent
McKinzie

(10) Patent No.: US 9,885,351 B2
(45) Date of Patent: Feb. 6, 2018

(54) SYSTEM AND METHOD OF CONTROLLING A PUMP SYSTEM USING INTEGRATED DIGITAL INPUTS

(71) Applicant: Regal Beloit America, Inc., Beloit, WI (US)

(72) Inventor: Marc C. McKinzie, West Milton, OH (US)

(73) Assignee: Regal Beloit America, Inc., Beloit, WI (US)

( * ) Notice: Subject to any disclaimer, the term of this patent is extended or adjusted under 35 U.S.C. 154(b) by 1034 days.

(21) Appl. No.: 13/842,624

(22) Filed: Mar. 15, 2013

(65) Prior Publication Data

US 2014/0277776 A1    Sep. 18, 2014

(51) Int. Cl.
*F04B 49/06* (2006.01)
*F04B 49/20* (2006.01)
*G05D 7/06* (2006.01)

(52) U.S. Cl.
CPC ............ *F04B 49/065* (2013.01); *F04B 49/20* (2013.01); *G05D 7/0617* (2013.01)

(58) Field of Classification Search
CPC ........ F04B 49/065; F04B 49/06; F04B 49/20; F04D 15/0066; G05B 15/02; G05D 7/0617
USPC ................................ 700/282, 83; 417/44.11
See application file for complete search history.

(56) References Cited

U.S. PATENT DOCUMENTS 5,217,478 A    6/1993  Rexroth
5,220,478 A    6/1993  Innes et al.
5,269,794 A   12/1993  Rexroth
5,343,590 A    9/1994  Radabaugh
5,949,346 A    9/1999  Suzuki et al.
7,334,510 B2   2/2008  Gerdes et al.
(Continued)

FOREIGN PATENT DOCUMENTS

CN    101265901    9/2008
CN    101356488    1/2009
(Continued)

OTHER PUBLICATIONS

IEEE Universidad Tecnológica de Panamá, Building an Arduino controlled pump [online], 2012 [Retrieved: Mar. 25, 2017], Retrieved from internet: <URL:http://sites.ieee.org/sb-utp/tutorials/building-arduino-controlled-pump/>.*
(Continued)

*Primary Examiner* — Sean Shechtman
*Assistant Examiner* — Shon Foley
(74) *Attorney, Agent, or Firm* — Michael Best & Friedrich LLP

(57) ABSTRACT

A pump system including a motor, a fluid pump powered by the motor, a user-interface, and a controller. The controller including a user-interface input electrically coupled to the user-interface, a serial communication input, a digital input having a plurality of digital input pins sharing a common ground pin, a processor, and a computer readable memory. The computer readable memory storing instructions that, when executed by the processor, cause the controller to receive an operating signal simultaneously from the serial communication input and the digital input, and control the motor based on one of the operating signal from the serial communication input and the operating signal from the digital input.

20 Claims, 5 Drawing Sheets

(56) References Cited

U.S. PATENT DOCUMENTS

| | | |
|---|---|---|
| 7,351,274 B2 | 4/2008 | Helt et al. |
| 7,536,936 B2 | 5/2009 | Gerdes et al. |
| 7,640,832 B2 | 1/2010 | Gerdes et al. |
| 7,681,478 B2 | 3/2010 | Gerdes et al. |
| 8,046,185 B1 | 10/2011 | Chui |
| 8,188,876 B1 | 5/2012 | Holley et al. |
| 2005/0016338 A1 | 1/2005 | Gerdes et al. |
| 2005/0022639 A1 | 2/2005 | Gerdes et al. |
| 2007/0039462 A1 | 2/2007 | Helt et al. |
| 2007/0083582 A1* | 4/2007 | Chambers ........... G06F 13/4213 708/490 |
| 2007/0127511 A1 | 6/2007 | Cedrone et al. |
| 2007/0154322 A1* | 7/2007 | Stiles, Jr. ................ F04B 49/20 417/44.1 |
| 2008/0016996 A1 | 1/2008 | Gerdes et al. |
| 2008/0121076 A1 | 5/2008 | Gerdes et al. |
| 2010/0043409 A1* | 2/2010 | Naydenov ........... F02D 41/3082 60/287 |
| 2011/0087390 A1 | 4/2011 | Pandit et al. |
| 2012/0042667 A1 | 2/2012 | Fulmer et al. |
| 2012/0157253 A1 | 6/2012 | Hoff |
| 2012/0230846 A1 | 9/2012 | Stephens |
| 2016/0062327 A1* | 3/2016 | Fagan ................... G05B 15/02 700/83 |

FOREIGN PATENT DOCUMENTS

| | | |
|---|---|---|
| CN | 201730811 | 2/2011 |
| CN | 102115229 | 7/2012 |
| CN | 102678530 | 9/2012 |
| GB | 2301894 | 12/1996 |
| WO | 2007021854 | 2/2007 |
| WO | 2010107536 | 9/2010 |
| WO | 2011039771 | 4/2011 |
| WO | 2011106557 | 9/2011 |
| WO | 2012087563 | 6/2012 |

OTHER PUBLICATIONS

YourDuino, Pins Bits Ones and Zeros High and Low . . . You'll Know!! [online], Feb. 21, 2012 [Retrieved: Mar. 25, 2017], Retrieved from internet: <URL:https://web.archive.org/web/20120221015646/http://yourduino.com/pins-bits-1-0-.htm>.*
Extended Search Report from the European Patent Office for Application No. 14275070.2 dated Jan. 7, 2015 (6 pages).
Hayward EcoStar Owner's Manual for EcoStar Variable Speed Pump; IS3400VSP Rev-B; pp. 1-32.
First Office Action from the State Intellectual Property Office of China for Application No. 201410158125.7 dated Sep. 7, 2016 (15 pages).
Office Action from the Mexican Intellectual Property Office for Application No. MX/a/2014/003167 dated Jul. 28, 2016 (6 pages).
Second Office Action from the State Intellectual Property Office of China for Application No. 201410158125.7 dated May 10, 2017 (12 pages).

* cited by examiner

SYSTEM AND METHOD OF CONTROLLING A PUMP SYSTEM USING INTEGRATED DIGITAL INPUTS

BACKGROUND

The present invention relates to control applications for a system (such as a pool system). More specifically, some embodiments of the invention relate to system for controlling the operation of a pump system in a pool system.

SUMMARY

Pool systems often include a main control system for controlling a pump motor. The main control system is operable to receive inputs (e.g., digital inputs, serial communication inputs, etc.) from various outside control systems (e.g., an automation system, a solar system, etc.). Often times, an external piece of hardware is necessary for the main control system to receive digital inputs from the outside control systems. Main control systems that are able to receive digital inputs without the use of external hardware are generally not able to receive both digital inputs and serial communication inputs simultaneously. Also, main control systems that are able to receive digital inputs require a minimum of eight digital input pins, resulting in a connection which is relatively large and costly.

In one embodiment, the invention provides a controller for operating a motor in a pump system. The controller includes a digital input and a serial communication input, and is operable to receive digital inputs and serial communication inputs simultaneously. Further, the digital input of the controller includes five digital input pins, resulting in a fewer number of connection wires and a smaller connector, which is relatively low cost.

In one embodiment, the invention provides a pump system comprising a motor, a fluid pump powered by the motor, a user-interface, and a controller. The controller including a user-interface input electrically coupled to the user-interface, a serial communication input, a digital input having a plurality of digital input pins sharing a common ground pin, a processor, and a computer readable memory. The computer readable memory storing instructions that, when executed by the processor, cause the controller to receive an operating signal simultaneously from the serial communication input and the digital input, and control the motor based on one of the operating signal from the serial communication input and the operating signal from the digital input.

In another embodiment the invention provides a controller for controlling a pump system including a user-interface and a motor. The controller comprising a user-interface input electrically coupled to the user-interface, a serial communication input, a digital input having a plurality of digital input pins sharing a common ground pin, a processor, and a computer readable memory. The computer readable memory storing instructions that, when executed by the processor, cause the controller to receive an operating signal simultaneously from the serial communication input and the digital input, and control the motor based on one of the operating signal from the serial communication input and the operating signal from the digital input.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
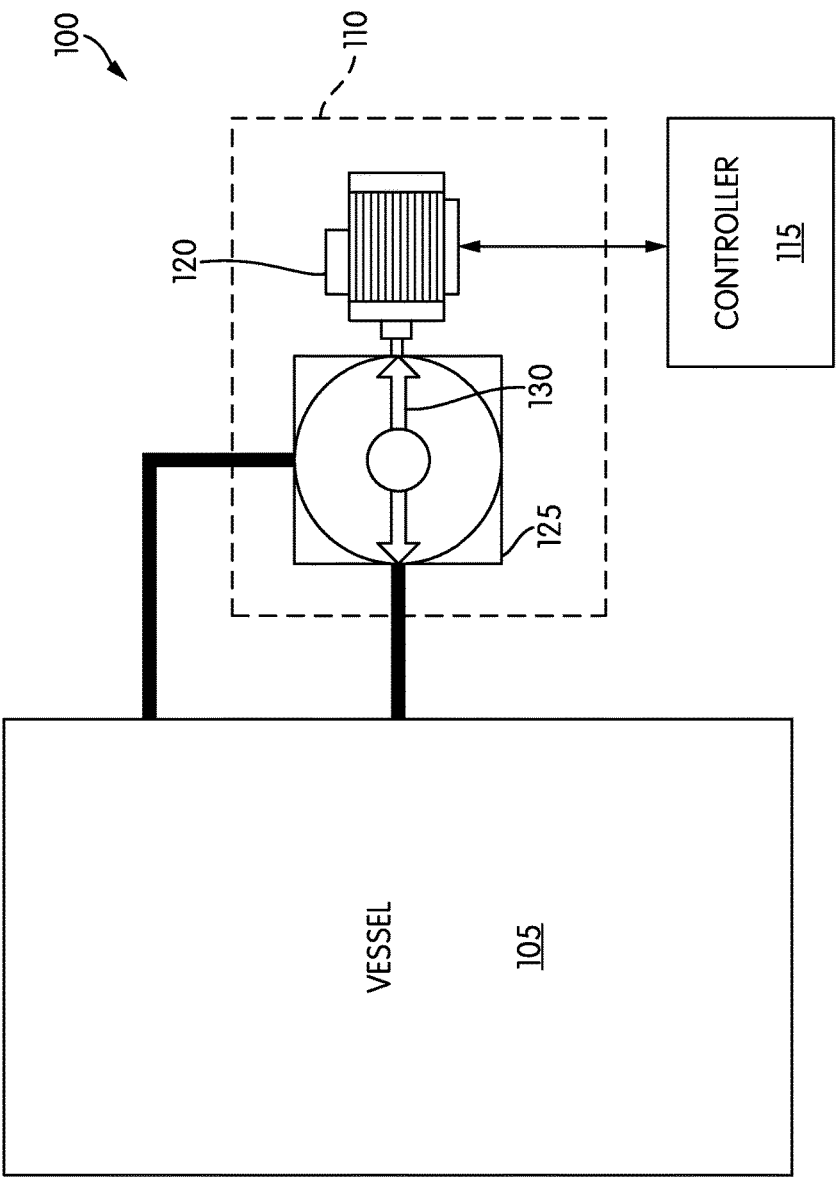
FIG. 1 illustrates a pool system.

FIG. 1 illustrates a pool or spa system 100. The pool system 100 includes a vessel 105, a pump system 110, and a controller 115. In some constructions, the vessel 105 is a hollow container such as a tub, pool, or vat that holds a fluid. In some constructions, the fluid is chlorinated water.

The pump system 110 includes a motor 120, a fluid pump 125, and a fluid agitator 130. In one construction, the motor 120 is a brushless direct-current (BLDC) motor. As is commonly known, BLDC motors include a stator, a permanent magnet rotor, and an electronic commutator. The electronic commutator is electrically connected to a motor controller. The motor controller controls the electronic commutator. The electronic commutator then provides the appropriate electrical energy to the stator in order to rotate the permanent magnet rotor at a desired speed. In other constructions, the motor 120 can be a variety of other types of motors, including but not limited to, a brush direct-current motor, a stepper motor, a synchronous motor, an induction motor, a vector-driven motor, a switched reluctance motor, and other DC or AC motors. In some constructions, the motor 120 is a variable speed motor. In other constructions, the motor 120 can be a multi-speed motor or a single speed motor.

The motor 120 is coupled to the fluid pump 125 by a shaft or similar connector. The fluid agitator 130 is contained within the fluid pump 125. In some constructions, the fluid agitator 130 is a rotor, such as an impeller or a fan. In operation, the motor 120 rotates the fluid agitator 130 located within the fluid pump 125. As the fluid agitator 130 is rotated, the fluid agitator 130 controllably moves the fluid contained by the vessel 105 through the pool system 100. Other pump systems having other fluid agitators may be used without departing from the spirit of the invention.

Figure 2:
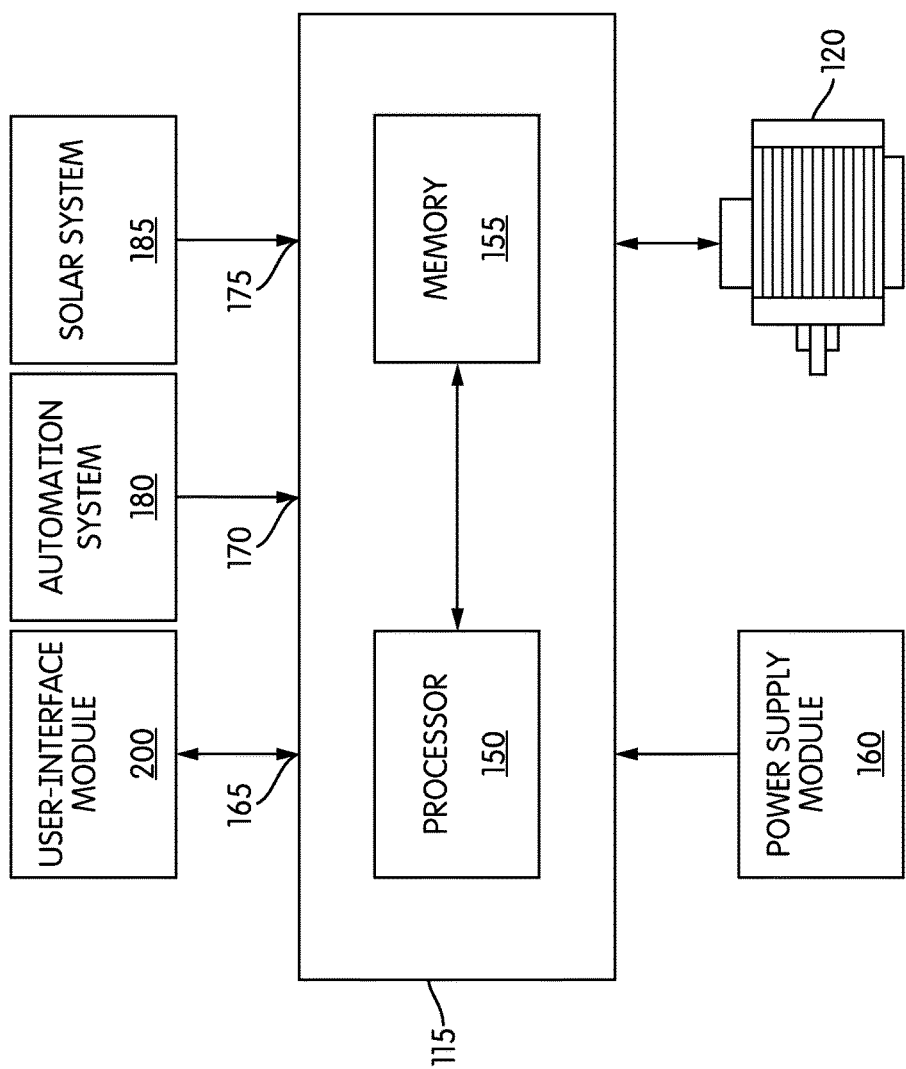
FIG. 2 illustrates a controller of the pool system of FIG. 1.

FIG. 2 illustrates the controller 115 of the pool system 100. The controller 115 is electrically and/or communicatively connected to a variety of modules or components of the pool system 100. For example, the controller 115 is connected to the motor 120 via the motor controller. The controller 115 includes combinations of hardware and software that are operable to, among other things, control the operation of the pool system 100.

In some constructions, the controller 115 includes a plurality of electrical and electronic components that provide power, operational control, and protection to the components and modules within the controller 115 and pool system 100. For example, the controller 115 includes, among other things, a processor 150 (e.g., a microprocessor, a microcontroller, or another suitable programmable device) and a memory 155. In some constructions, the controller 115 is implemented partially or entirely on a semiconductor (e.g., a field-programmable gate array ["FPGA"], microcontroller, or digital signal processor ["DSP"] semiconductor) chip.

The memory 155 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processor unit 150 is connected to the memory 155 and executes software instructions that are capable of being stored in a RAM of the memory 155 (e.g., during execution), a ROM of the memory 155 (e.g., on a generally permanent basis), or another non-transitory computer readable medium such as another memory or a disc. Software included in the implementation of the pool system 100 can be stored in the memory 155 of the controller 115. The software includes, for example, firmware, one or more applications, program data, filters, rules, one or more program modules, and other executable instructions. The controller 115 is configured to retrieve from memory and execute, among other things, instructions related to the control processes and methods described herein. In other constructions, the controller 115 includes additional, fewer, or different components.

The controller 115 receives power from a power supply module 160. The power supply module 160 supplies a nominal AC or DC voltage to the controller 115 or other components or modules of the pool system 100. The power supply module 160 is powered by, for example, a power source having nominal line voltages between 110V and 240V AC and frequencies of approximately 50-60 Hz. The power supply module 160 is also configured to supply lower voltages to operate circuits and components within the controller 115 or pool system 100. In other constructions, the controller 115 or other components and modules within the pool system 100 are powered by one or more batteries or battery packs, or another grid-independent power source (e.g., a generator, a solar panel, etc.).

The controller 115 further includes a user-interface input 165, a serial communication input 170, and a digital input 175. The controller 115 is operable to receive an operating signal from at least one of the user-interface input 165, the serial communication input 170, and the digital input 175. For example, the operating signal includes, but is not limited to, operating instructions including instructions to operate the motor 120 at a selected speed for a selected duration of time (e.g., 1600 RPM for 2 hours). In some constructions, the controller 115 receives operating signals from the user-interface input 165, the serial communication input 170, and the digital input 175. The controller 115 then uses a priority control algorithm for determining which operating signal will be used to operate the motor 120.

In some constructions, an automation system 180, a solar system 185, or both are electrically coupled to the controller 115. In the illustrated construction, the automation system 180 is electrically coupled to the controller 115 via the serial communication input 170, while the solar system 185 is electrically coupled to the controller 115 via the digital input 175. In such a construction, the controller 115 is operable to receive operating signal at the serial communication input 170 and the digital input 175 simultaneously. In other constructions, both the automation system 180 and the solar system 185 are electrically coupled to the controller 115 via the digital input 175. In another construction, only the automation system 180 is electrically coupled to the controller 115 via the digital input 175 or the serial communication input 170. In another construction, only the solar system 185 is electrically coupled to the controller 115 via the digital input 175 or the serial communication input 170.

The automation system 180 controls the overall operation of the pool system 100. The automation system 180 outputs an operating signal to the controller 115 for controlling the operation of the motor 120. The automation system 180 also controls other various components of the pool system 100, for example, but not limited to, pool lights, a vacuum cleaner, and a pool heater.

The solar system 185 is a photovoltaic system for converting solar energy into usable energy for heating the fluid contained within the pool system 100. In operation, the fluid contained within the pool system 100 is pumped through solar panels of the solar system 185. The fluid is heated as it is pumped through the solar panels by the pump system 110. The solar system 185 outputs an operating signal to the controller 115 for operating the motor 120 to pump the fluid. In some constructions, the solar system 185 outputs the operating signal to operate the motor 120 during peak sunlight times. In some constructions, the solar system 185 outputs the operating signal to operate the motor 120 when the ambient temperature reaches a predetermined threshold.

Figure 3:
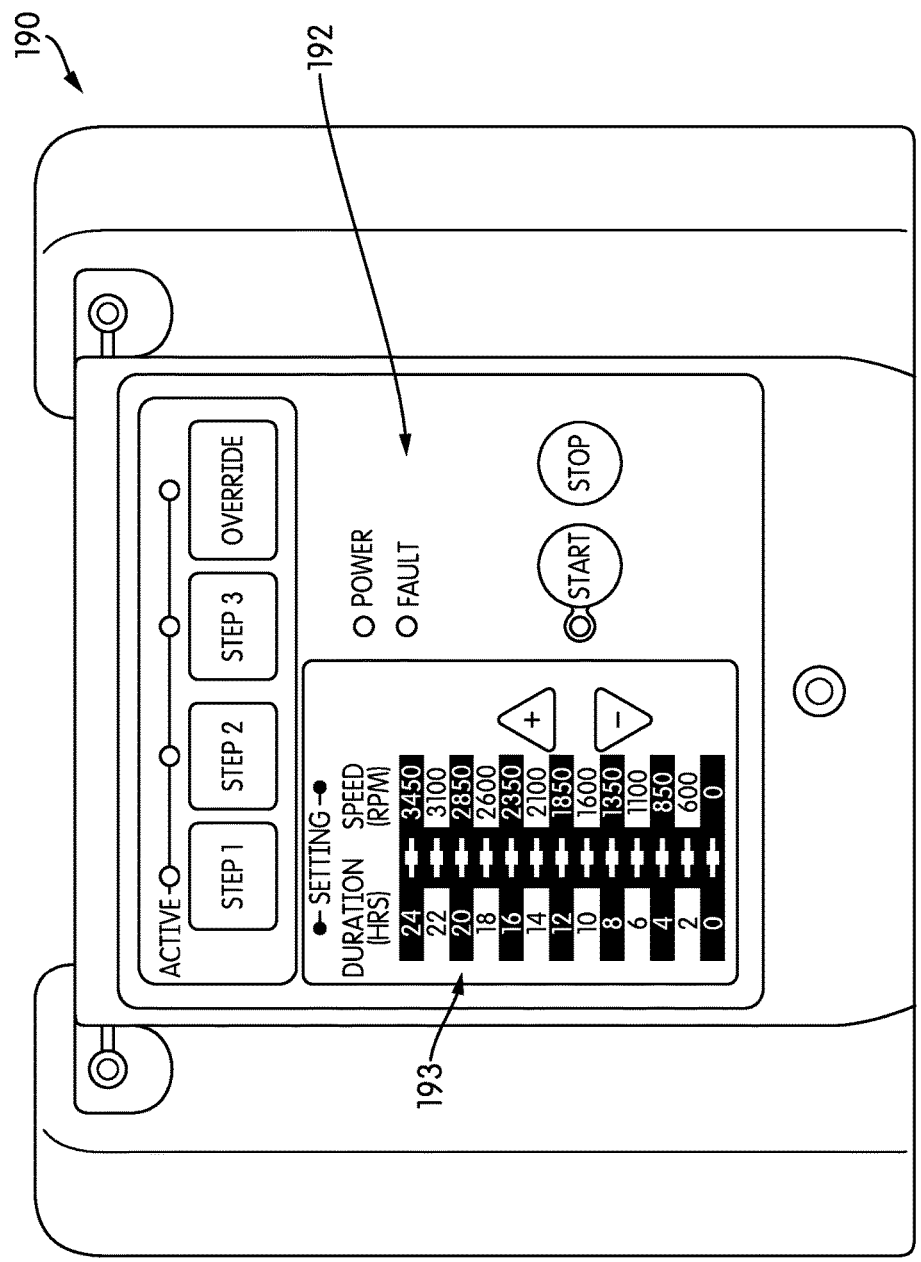
FIG. 3 illustrates a user-interface of the controller of FIG. 2.

FIG. 3 illustrates one example of a user-interface 190. The user-interface 190 is electrically coupled to the controller 115 via the user-interface input 165. The user-interface 190 is operable to receive user-instructions from an operator. The user-interface 190 outputs an operating signal, based on the received user-instructions, to the user-interface input 165 of the controller 115. The controller 115 operates the motor 120 based on the operating signal. In the illustrated embodiment, the user interface includes a plurality of inputs 192 and a plurality of indicators 193. The operator uses the plurality of inputs 192 to input the user-instructions. The plurality of indicators 193 are used to indicate conditions of the pool system 100, such as motor speed and duration status.

Figure 4:
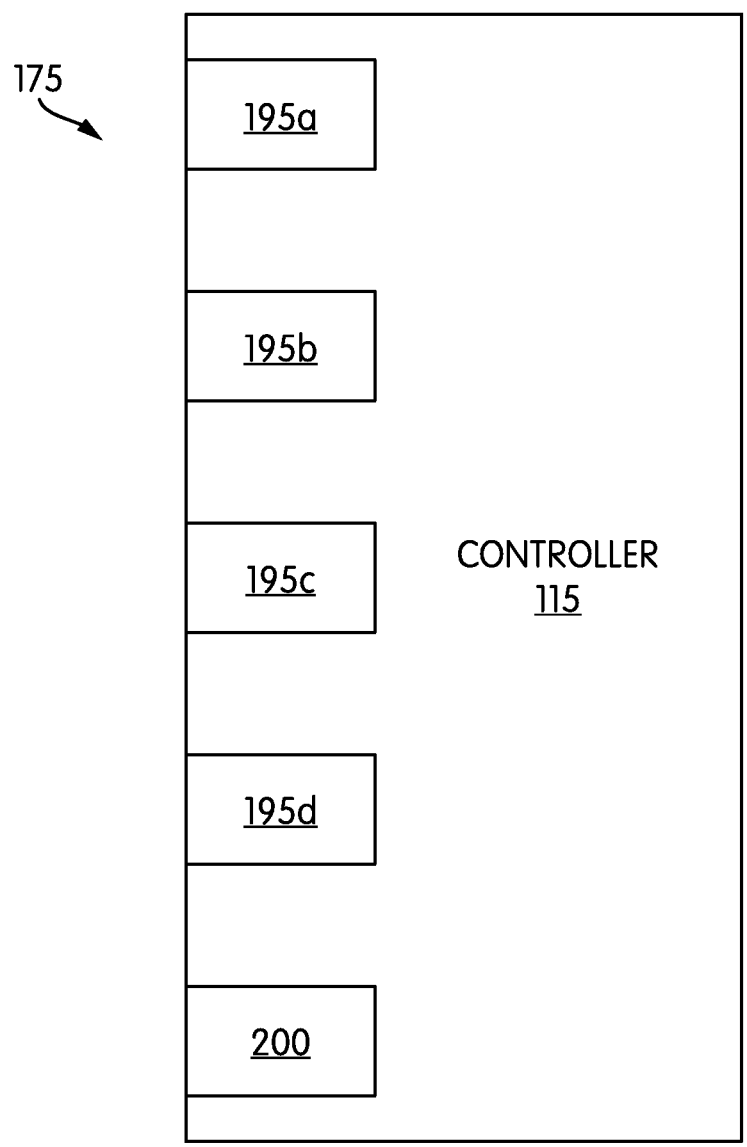
FIG. 4 illustrates a digital input of the controller of FIG. 2.

FIG. 4 illustrates the digital input 175 of the controller 115. The digital input includes a plurality of input pins 195a-195d and a common pin 200. The input pins 195a-195d are operable to receive digital signals. The digital signals represent operating signals received by the controller 115. In some constructions, the digital signals are a high signal or a low signal, representing a duration of operation time. In other constructions, the digital signals are pulse-width modulated signals representing both a duration of operation time and operation speed. The common pin 200 is a common ground, and is shared by the plurality of input pins 195a-195d. In some constructions, the controller 115 follows a priority control algorithm when receiving multiple digital signals at the plurality of input pins 195a-195d. For example, the input pins 195a-195d are assigned priorities from highest to lowest. If multiple digital signals are received at the various input pins 195a-195d, the controller 115 will determine which input pin 195a-195d has the highest priority and operate the motor based on the digital signal received at that input pin 195a-195d.

In some constructions, as discussed above, the automation system 180 and the solar system 185 are electrically coupled to the controller 115 via the digital input 175. In such a construction, the automation system 180 may be electrically connected to pins 195a-195c, while the solar system 185 may be electrically connected to pin 195d. In such a construction, the controller 115 follows the priority control algorithm when receiving digital signals from the automation system 180 and the solar system 185.

In some constructions, the controller 115 operates the motor 120 according to operating stages. During an operating stage, the motor 120 is operated at a set speed for a set duration of time. In some constructions, the pins 195a-195d correspond to operating stages of the motor 120. For example, pin 195a corresponds to a first stage, pin 195b corresponds to a second stage, pin 195c corresponds to a third stage, and pin 195d corresponds to an override stage. In such a construction, the user-interface 190 is used to set the motor speeds of the stages and the automation system 180 or the solar system 185 control the run duration of the stages via the pins 195a-195d.

Figure 5:
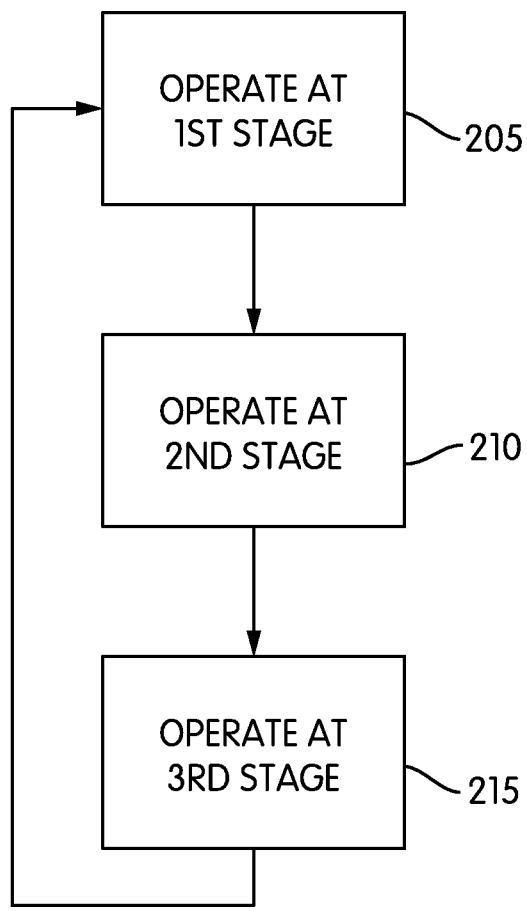
FIG. 5 illustrates an operation of the controller of FIG. 2.

FIG. 5 illustrates an operation 200 of the controller 115 controlling the motor 120 according to operating stage. The controller 115 operates the motor 120 at a first operating speed for a first duration of time according to a first operating stage (Step 205). The controller 115 operates the motor 120 at a second operating speed for a second duration of time according to a second operating stage (Step 210). The controller 115 operates the motor 120 at a third operating speed for a third duration of time according to a third operating stage (Step 205). The operation 200 then reverts back to Step 205.

In some constructions, the controller 115 is operable to receive an override signal corresponding to an override stage. In such a construction, when the controller 115 receives the override signal, the controller 115 will suspend the first operating stage, second operating stage, or third operating stage, and operate the motor 120 according to an override speed for an override duration of time. In some constructions, the controller is operable to receive a stop signal, for example, but not limited to, the user-interface. In such a construction, upon receiving the stop signal, the controller 115 will stop operation of the motor.

Thus, the invention provides, among other things, a control system including integrated digital inputs, the control system controlling a pump system. Various features and advantages of the invention are set forth in the following claims.

What is claimed is:
1. A pump system comprising:
a motor;
a fluid pump powered by the motor;
a user-interface; and
a controller including
a user-interface input electrically coupled to the user-interface,
a serial communication input for receiving a serial communication operating signal,
a digital input having a first digital input pin, a second digital input pin, and a common ground pin for the first digital input pin and the second digital input pin, the first digital input pin and the common ground pin for receiving a first digital operating signal, and the second digital input pin and the common ground pin for receiving a second digital operating signal,
a processor, and
a computer readable memory storing instructions that, when executed by the processor, cause the controller to
receive simultaneously the serial communication operating signal and at least one of the first digital operating signal and the second digital operating signal,
use a priority control algorithm for selecting an operating signal of the serial communication operating signal and at least one of the first digital operating signal and the second digital operating signal, and
control, resulting from the selection using the priority control algorithm, the motor based on one of the operating signal from the serial communication input and the operating signal from the digital input.

2. The pump system of claim 1, wherein the instructions, when executed by the processor, further cause the controller to
receive an operating signal from the user-interface input, and
control the motor based on the operating signal from the user-interface input.

3. The pump system of claim 1, wherein the controller receives the first digital operating signal from at least one of an automation system and a solar system.

4. The pump system of claim 1, wherein the plurality of digital input pins receive the first digital operating signal and the second digital operating signal corresponding to operating stages, the operating signals including at least one of an operating speed signal and an operating duration signal.

5. The pump system of claim 4, wherein
the first digital operating signal received at a first digital input pin corresponds to a first operating stage,
the second digital operating signal received at a second digital input pin corresponds to a second operating stage,
a third digital operating signal received at a third digital input pin corresponds to a third operating stage, and
an override digital operating signal received at an override digital input pin corresponds to an override operating stage.

6. The pump system of claim 5 wherein the instructions, when executed by the processor, further cause the controller to
control the motor based on the first digital operating signal,
control the motor based on the second digital operating signal,
control the motor based on the third digital operating signal, and
control the motor based on the override digital operating signal.

7. The pump system of claim 5, wherein the controller uses the priority control algorithm for selecting the first digital operating signal, the second digital operating signal, the third digital operating signal, or the override digital operating signal, for controlling the motor.

8. The controller of claim 1, wherein the controller is operable to receive a user-interface operating signal at the user-interface input.

9. The controller of claim 8, wherein the controller uses the priority control algorithm for selecting the user-interface operating signal, the serial communication operating signal, the first digital operating signal, or the second digital operating signal, for controlling the motor.

10. The pump system of claim 1, wherein the first digital operating signal is a pulse-width modulated signal representing both a duration of operation time and an operation speed.

11. A controller for controlling a pump system including a user-interface and a motor, the controller comprising:
- a user-interface input electrically coupled to the user-interface;
- a serial communication input for receiving a serial communication operating signal;
- a digital input having a first digital input pin, a second digital input pin, and a common ground pin for the first digital input pin and the second digital input pin, the first digital input pin and the common ground pin for receiving a first digital operating signal, and the second digital input pin and the common ground pin for receiving a second digital operating signal;
- a processor; and
- a computer readable memory storing instructions that, when executed by the processor, cause the controller to
  - receive simultaneously the serial communication operating signal and at least one of the first digital operating signal and the second digital operating signal,
  - use a priority control algorithm for selecting an operating signal of the serial communication operating signal and at least one of the first digital operating signal and the second digital operating signal, and
  - control, resulting from the selection using the priority control algorithm, the motor based on one of the operating signal from the serial communication input and the operating signal from the digital input.

12. The controller of claim 11, wherein the instructions, when executed by the processor, further cause the controller to
- receive an operating signal from the user-interface input, and
- control the motor based on the operating signal from the user-interface input.

13. The controller of claim 11, wherein the plurality of digital input pins receive the first digital operating signal and the second digital operating signal corresponding to operating stages, the operating signals including at least one of an operating speed signal and an operating duration signal.

14. The controller of claim 13, wherein
the first digital operating signal received at a first digital input pin corresponds to a first operating stage,
the second digital operating signal received at a second digital input pin corresponds to a second operating stage,
a third digital operating signal received at a third digital input pin corresponds to a third operating stage, and
an override digital operating signal received at an override digital input pin corresponds to an override operating stage.

15. The controller of claim 14, wherein the instructions, when executed by the processor, further cause the controller to
- control the motor based on the first digital operating signal,
- control the motor based on the second digital operating signal,
- control the motor based on the third digital operating signal, and
- control the motor based on the override digital operating signal.

16. The controller of claim 14, wherein the controller uses the priority control algorithm for selecting the first digital operating signal, the second digital operating signal, the third digital operating signal, or the override digital operating signal, for controlling the motor.

17. The controller of claim 11, wherein the controller receives the first operating signal from at least one of an automation system and a solar system.

18. The controller of claim 11, wherein the controller is operable to receive a user-interface operating signal at the user-interface input.

19. The controller of claim 18, wherein the controller uses the priority control algorithm for selecting the user-interface operating signal, the serial communication operating signal, the first digital operating signal, or the second digital operating signal, for controlling the motor.

20. The controller of claim 11, wherein the first digital operating signal is a pulse-width modulated signal representing both a duration of operation time and an operation speed.

* * * * *